(12) United States Patent
Lei et al.

(10) Patent No.: US 11,454,508 B2
(45) Date of Patent: Sep. 27, 2022

(54) METHOD AND APPARATUS FOR UPCOMING TURN IDENTIFICATION AND ASSISTANCE

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 17/067,933

(22) Filed: Oct. 12, 2020

(65) Prior Publication Data
US 2021/0025726 A1   Jan. 28, 2021

Related U.S. Application Data

(63) Continuation of application No. 15/218,542, filed on Jul. 25, 2016, now Pat. No. 10,801,853.

(51) Int. Cl.
| | |
|---|---|
| *G01C 21/36* | (2006.01) |
| *G08G 1/09* | (2006.01) |
| *H04W 4/80* | (2018.01) |
| *H04L 67/12* | (2022.01) |
| *G08G 1/0967* | (2006.01) |

(Continued)

(52) U.S. Cl.
CPC ..... *G01C 21/3626* (2013.01); *G01C 21/3655* (2013.01); *G01C 21/3673* (2013.01); *G08G 1/0969* (2013.01); *G08G 1/096716* (2013.01); *G08G 1/096783* (2013.01); *G08G 1/096791* (2013.01); *G08G 1/096861* (2013.01); *G08G 1/137* (2013.01); *H04L 67/12* (2013.01); *H04W 4/80* (2018.02)

(58) Field of Classification Search
CPC ............ G01C 21/3626; G01C 21/3655; G01C 21/3673; G01C 21/34; G08G 1/096716; G08G 1/096783; G08G 1/096791; G08G 1/096861; G08G 1/0969; G08G 1/137; H04L 67/12; H04W 4/80
See application file for complete search history.

(56) References Cited

U.S. PATENT DOCUMENTS

| | | |
|---|---|---|
| 6,212,474 B1 | 4/2001 | Fowler et al. |
| 7,925,438 B2 | 4/2011 | Lo |

(Continued)

FOREIGN PATENT DOCUMENTS

| | | |
|---|---|---|
| CN | 1975333 A | 6/2007 |
| CN | 101006324 A | 7/2007 |

(Continued)

*Primary Examiner* — Rodney A Butler
(74) *Attorney, Agent, or Firm* — Michael Spenner; Brooks Kushman P.C.

(57) ABSTRACT

A system includes a processor configured to determine a navigation instruction execution location within a predefined distance from a vehicle location. The processor is also configured to communicate with a wireless transceiver to receive information identifying an intervening turn-option location, between the execution location and vehicle location. The processor is further configured to determine a distance between the vehicle location and turn-option location and display the determined distance on a navigation display, until the vehicle passes the turn-option location.

20 Claims, 3 Drawing Sheets

(51) Int. Cl.
    *G08G 1/0969*    (2006.01)
    *G08G 1/0968*    (2006.01)
    *G08G 1/137*     (2006.01)

(56) References Cited

U.S. PATENT DOCUMENTS

| | | |
|---|---|---|
| 2001/0027377 A1 | 10/2001 | Shimabara |
| 2005/0187710 A1 | 8/2005 | Walker |
| 2009/0192677 A1 | 7/2009 | Cech et al. |
| 2009/0216431 A1 | 8/2009 | Vu et al. |
| 2010/0324775 A1 | 12/2010 | Kermani et al. |
| 2013/0158864 A1 | 6/2013 | Kim et al. |
| 2014/0368330 A1 | 12/2014 | Watanabe et al. |
| 2015/0197248 A1* | 7/2015 | Breed ............... G08G 1/09626 340/905 |
| 2015/0220991 A1 | 8/2015 | Butts et al. |
| 2017/0124869 A1 | 5/2017 | Popple |
| 2018/0005254 A1 | 1/2018 | Bai et al. |

FOREIGN PATENT DOCUMENTS

| | | |
|---|---|---|
| CN | 101290230 A | 10/2008 |
| CN | 101606040 A | 12/2009 |
| CN | 102607567 A | 7/2012 |
| CN | 102636180 A | 8/2012 |
| CN | 103077624 A | 5/2013 |
| CN | 104966407 A | 10/2015 |
| CN | 105043397 A | 11/2015 |

* cited by examiner

METHOD AND APPARATUS FOR UPCOMING TURN IDENTIFICATION AND ASSISTANCE

CROSS-REFERENCE TO RELATED APPLICATIONS

This application is a continuation of U.S. application Ser. No. 15/218,542 filed Jul. 25, 2016, now U.S. Pat. No. 10,801,853, issued Oct. 13, 2020, the disclosure of which is hereby incorporated in its entirety by reference herein.

TECHNICAL FIELD

The illustrative embodiments generally relate to a method and apparatus for upcoming turn identification and assistance.

BACKGROUND

Many vehicle drivers rely on navigation assistance when traveling, provided either by the vehicle directly or through a mobile device carried by the driver. Whether the navigation device is the vehicle or the mobile device, the navigation device relies on GPS data received from a satellite and information stored in and retrieved from a map database.

Directions for turning frequently include instructions such as "turn left in four hundred feet." On a given roadway, however, there may be possible left turns at two hundred feet, three hundred feet, four hundred feet and five hundred feet. Guessing which of the intersections is four hundred feet away can be a difficult task, especially in heavy traffic or inclement weather. Navigation systems try to assist with facilitating this task, by offering diminishing distance instructions and "turn now" type instructions, but drivers frequently overshoot the intersection or turn too soon. Processing delays and human interpretation of instructions both add barriers to facilitating the understanding of the directions.

Another common problem involves changing lanes too early. A driver may assume that an upcoming turn is the appropriate turn, and change lanes to proceed with the turn. The new lane may be a turn only lane, and by the time the driver or navigation system identifies that the intended turn is not the correct turn, the driver is stuck in a turn-only lane. If the driver had improved information about which upcoming turns were not the proper turns, the driver could have avoided changing lanes until the appropriate moment. A navigation system that reports instructions such as "turn in four hundred feet," "turn in two hundred feet," "turn in one hundred feet" still leaves it up to the driver to guess as to which street is four hundred feet away when there are multiple turn options adjoining the road.

SUMMARY

In a first illustrative embodiment, a system includes a processor configured to determine a navigation instruction execution location within a predefined distance from a vehicle location. The processor is also configured to communicate with a wireless transceiver to receive information identifying an intervening turn-option location, between the execution location and vehicle location. The processor is further configured to determine a distance between the vehicle location and turn-option location and display the determined distance on a navigation display, until the vehicle passes the turn-option location.

In a second illustrative embodiment, a system includes a processor configured to wirelessly receive signals from transceivers within a predefined proximity of a vehicle, identifying navigable driving-option locations upcoming along a route. The processor is also configured to display wirelessly identified navigable driving-option locations, responsive to a navigation instruction to maneuver within a predefined distance, including distances adaptively varying with vehicle location, from a vehicle location to the displayed navigable driving-option locations. Further, the processor is configured to remove displayed navigable driving-option locations as a vehicle passes respective locations.

In a third illustrative embodiment, a computer-implemented method includes receiving navigable driving-option location characteristics from a wireless transceiver provided in conjunction with a navigable driving-option. The method also includes displaying received navigable driving-option characteristics for a navigable driving-option between the vehicle location and the navigation location, responsive to a navigation instruction to execute a driving maneuver at a navigation location within a predefined distance of a vehicle location. Also, the method includes removing the displayed navigable driving-option characteristics once a vehicle passes a navigable driving-option location.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
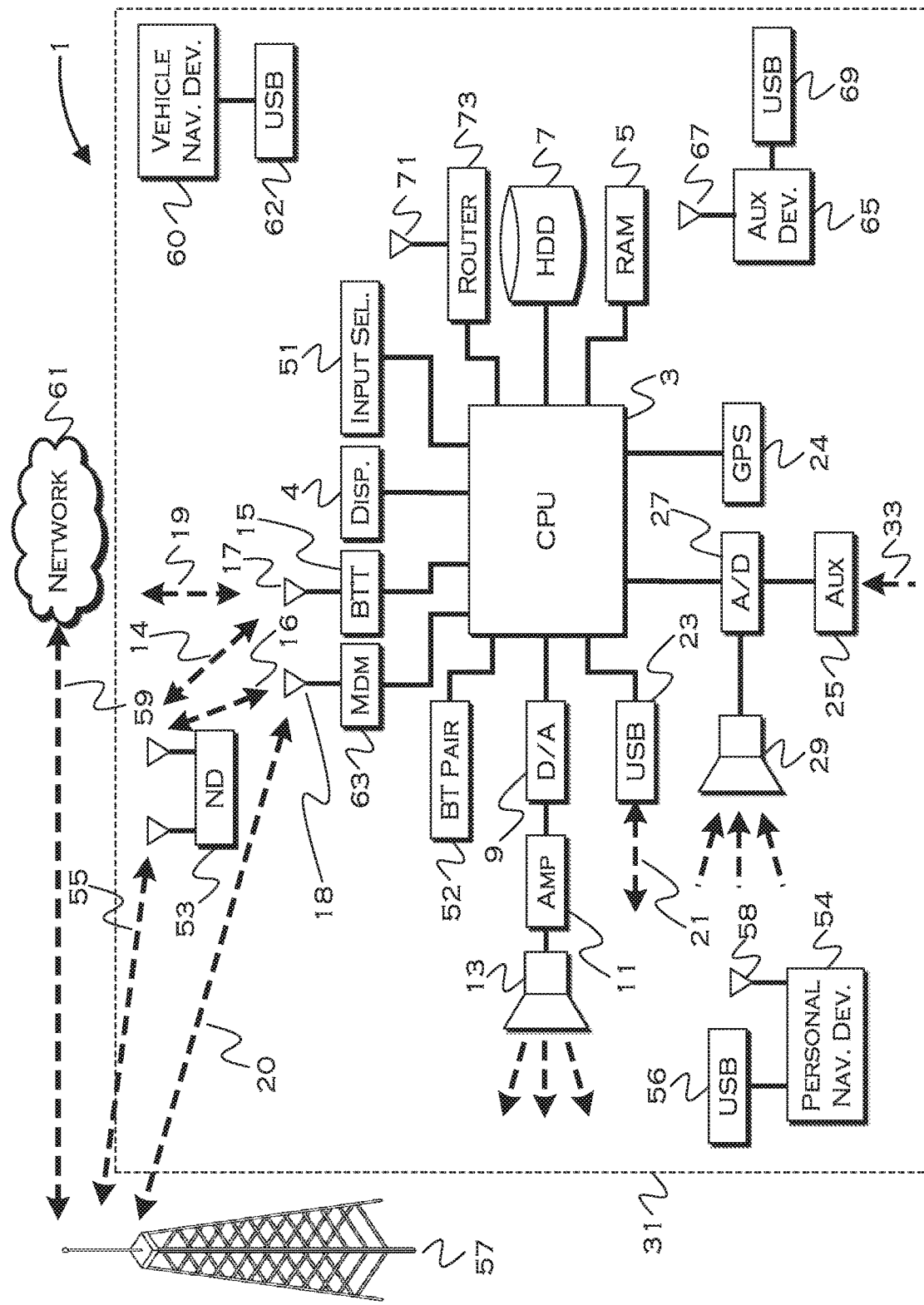
FIG. 1 illustrates an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In order to facilitate connected vehicle communication and provide an environment whereby autonomous vehicles can transfer necessary information between other vehicles and the infrastructure, the United States Department of Transportation (US DOT) is currently exploring the feasibility of deploying a number of wireless transceivers across the nation's road networks. The illustrative embodiments propose the use of similar transceivers or other deployed transmitters that broadcast identifying information relating to a particular intersection at which these devices are deployed.

Figure 2:
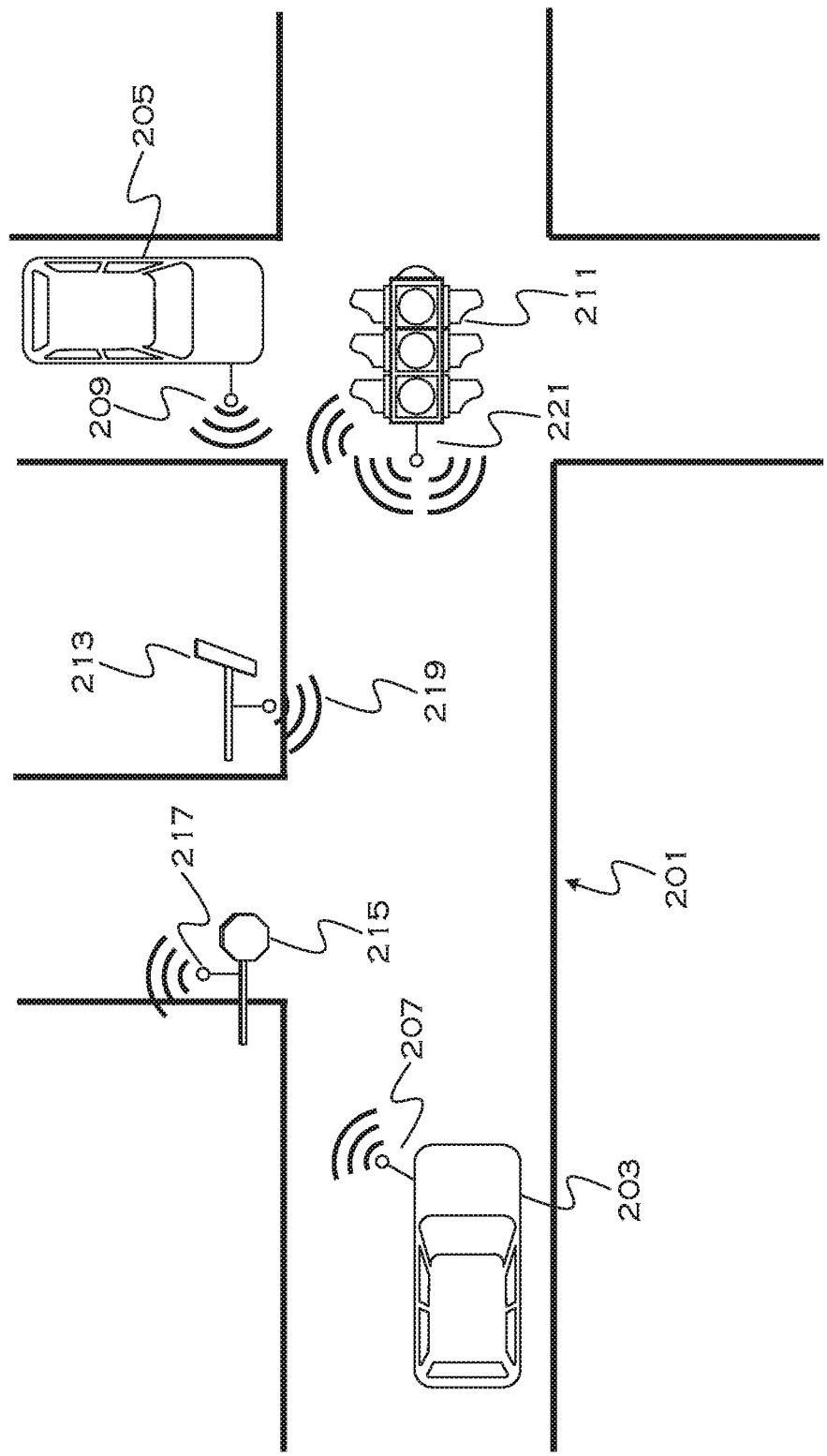
FIG. 2 illustrates an illustrative navigation environment.

FIG. 2 illustrates an illustrative navigation environment 201. In this example, a vehicle 203 travels down a roadway with an instruction to turn left in three hundred feet. The proper turn for this vehicle in this example is at the intersection including the stoplight 211, but there is also an intersection for Smith Street 213 that represents another possible intervening left hand turn.

If the driver is distracted or the weather is poor, or if the driver is a poor judge of distance, the driver could easily turn onto Smith Street instead of making the proper turn. Or, if the driver shifts lanes to the left-most lane to turn onto Smith Street, the driver could be stuck in a turn-only lane and forced to turn, even if the driver realizes that the turn is improper.

In this illustrative environment, the sign for Smith Street 213 is provided with a transmitter 219. This transmitter can be Wi-Fi, BLUETOOTH LOW ENERGY (BLE) or of any other suitable type sufficient to identify a roadway to vehicles within at least a predefined distance. The stop sign 215 on Smith Street has a similar beacon 217, although the transmission from this beacon is directed largely in the direction of traffic approaching the main road on which vehicle 203 is traveling.

The stoplight 211 at the intersection for the proper turn also has a beacon 221, which broadcasts in four directions corresponding to all possible approaching traffic. The object vehicle 203 includes a receiver (or transceiver) 207 capable of receiving the signals from the transmitters. The vehicle is also capable of vehicle to vehicle (VTV) communication with vehicle 205, which has a similar receiver 209.

Operating in this environment, the object vehicle 203 can receive information from the street sign transmitter 219, the stoplight transmitter 221 and the other vehicle 209. If the VTV communication range is longer and/or facilitated through a remote network such as cellular, locally proximate vehicles can communicate to share information about the observed local environment.

Under these conditions, the object vehicle receives location information about the GPS location of the Smith Street intersection from transmitter 219, the stoplight intersection from transmitter 221 and any intersections following the proper turn, relayed from the other vehicle 205. The object vehicle can use this information to improve a displayed map within the vehicle, showing, for example, where not to turn and/or actual distances to intervening and proper turn locations. That is, instead of showing a map with an instruction that says "turn left in three hundred feet," the vehicle map may also display Smith Street at being one hundred feet away (with the distance to Smith Street displayed) and the main intersection as being three hundred feet away with the distance to the main intersection displayed. The vehicle can easily calculate the distance to both points because it knows its own location and has received identification of the location of the transmitters.

The vehicle could also populate the map with data after the turn, based on information received from VTV relay from vehicle 205, even if the object vehicle 203 is not yet in range of any identifying transmission points following the turn. This could be useful if the vehicle had to turn again quickly after making the initial left turn.

Any number of traffic control features and/or businesses could provide transceivers capable of wireless communication with a vehicle. A vehicle can display the received characteristics of the object including the transceiver (street sign/name, traffic light, business identification, etc.), so that a driver can visually identify upcoming landmarks and the corresponding distances to those landmarks. This visual presentation can make determining the distance (e.g., 500 feet) to a turn easier, because the driver can quickly see on the navigation display that Smith St. is 200 feet ahead and WALMART is 400 feet ahead. The driver can visually translate this navigation information into the viewable real world environment, recognizing a sign for Smith Street and a large WALMART, and know that the turn at 500 feet is just after passing WALMART.

Figure 3:
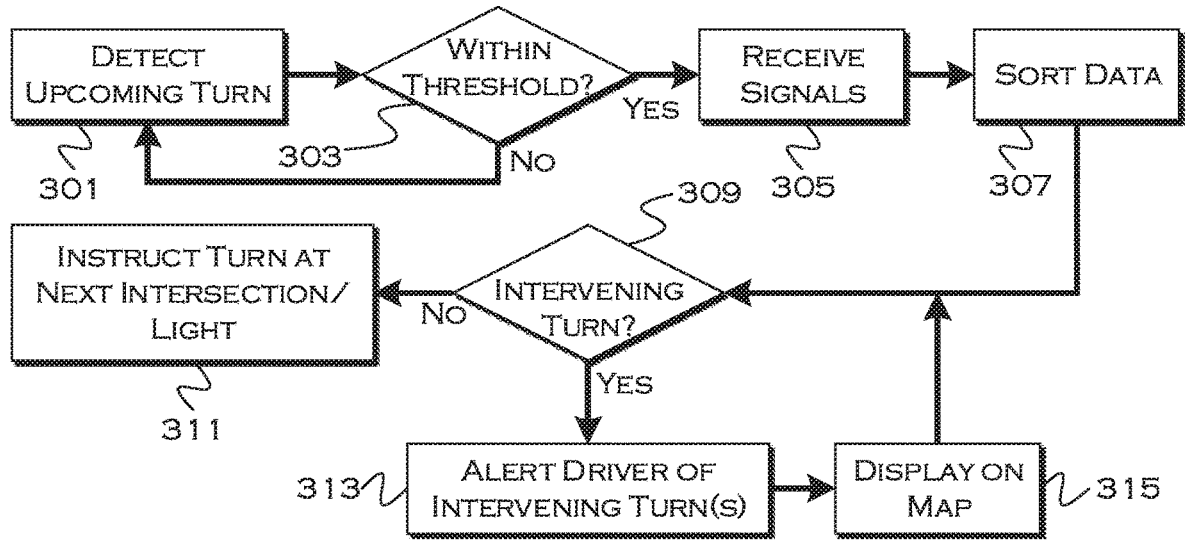
FIG. 3 illustrates an illustrative process for navigation data provision.

FIG. 3 illustrates a representative process for navigation data provision. In this illustrative process, the vehicle detects an upcoming turn 301. The vehicle could base this determination on provided navigation instructions, for example. In another instance, the vehicle could work in conjunction with a wireless device providing the navigation instructions, relaying the instructions to a driver and/or providing the wireless device with supplemental navigation information to improve the navigation provided by the wireless device. The wireless device could also receive the information directly from the deployed transmitters, but some information sources such as dedicated short range communication (DSRC) and VTV transfers may be the sole province of vehicular communication and may be unavailable to the wireless device directly.

Wireless device navigation applications can be programmed to communicate with a vehicle computer, so if the vehicle leverages or otherwise cooperates with the wireless device navigation application, similar results to those described with respect to vehicular navigation programs can be achieved.

If the detected upcoming turn is within a threshold distance away 303, the vehicle will search for or process any wireless transmission signals relating to navigation data being provided by the environment 305. If, as proposed, all or many intersections included transmitters broadcasting relevant navigation data, the vehicle could be constantly receiving and updating map data for adjoining streets that is of no particular relevance to a driver. For example, a driver who is turning in 3.2 miles may care little about the fact that an upcoming street is two hundred feet away. To accommodate for this, in this example, the vehicle disregards signals from the deployed devices until they are relevant or useful (defined by the threshold distance to the turn) to a driver.

In other examples, where VTV communication is utilized to relay and convey information between vehicles about a local environment, the vehicle may gather the data but decline to update the map, instead preserving the data for relay to any requesting vehicles. The vehicle could certainly update the map if desired, but in this example the vehicle instead updates the map with data that becomes relevant as a turn approaches, and disregards additional data as extraneous.

Once the vehicle begins gathering the relevant data, the vehicle may observe a large number of signals from locally deployed transmitters. Accordingly, if needed, the vehicle sorts the data, possibly arranging the identified locations by side-of-street and distance. Data relating to a side-of-street in a direction that the vehicle is not turning may be less useful and may be disregarded in some examples. In other instances, however, this data may be useful because it may show a driver that a right-hand road exists at two hundred and fifty feet which can help identify when the turn at three hundred feet will occur (just after passing the right hand turn option).

If there are any intervening turns in the direction which a turn is intended 309, that is, if there is an opportunity for the driver to make a mistake, the vehicle can perform several actions. The vehicle can alert the driver 313 that one (or however many) turn exists prior to the identified turn or that intervening turns exist. The vehicle can also display the relevant street location information on a map 315, which may already include street names but can be updated to include the present distances (diminishing as the vehicle travels) to each street up to and including the turn street. Once the vehicle receives, determines and displays the initial information, updating the displayed data is a simple matter of decreasing the distance based on vehicle speed and travel time (e.g., 20 miles per hour is approximately 29 feet per second, so each second of vehicle travel at 20 miles per hour will decrement the distances to all upcoming streets by approximately 29 feet). The vehicle could further update the map by including do-not-turn indicia at the intervening streets, such as graying out the roads or placing a red "X" in front of the intersections on the map. Viewing and understanding this information on a vehicle display may be faster for a driver than staring down a stretch of road, seeing three possible left turns, and trying to guess at which one is three hundred feet away. Also, if there is weather or poorly placed signage (behind a tree limb, for example), the vehicle display will not suffer from any of these interfering factors.

Once the vehicle reaches a point of travel where there are no remaining intervening turns 309, the vehicle can notify the driver that a turn at the next intersection is appropriate 311. Also, since the signs and lights in this example self-identify, the vehicle can include this information as street signs and/or lights displayed on a map. The vehicle can also verbally include the information in instructions, such as "turn at the second upcoming street sign on the left" or "turn left at the next traffic signal." The existence of a traffic signal deployed on the road ahead, and a corresponding instruction or visualization on a navigation display, may be easier to understand than an instruction to turn left in five hundred feet (where the traffic signal is located).

Figure 4:
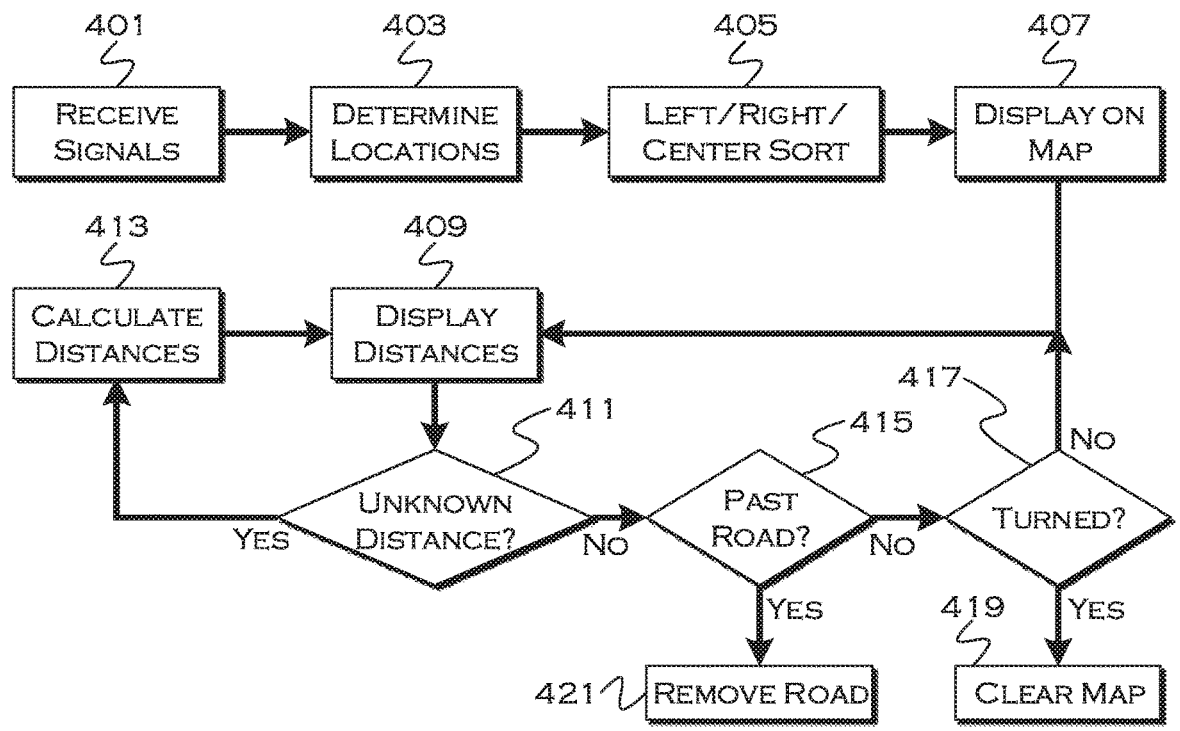
FIG. 4 illustrates an illustrative process for map updating.

FIG. 4 illustrates an illustrative process for map updating. In this example, the vehicle has begun receiving signals 401 from deployed identification transmitters and/or other vehicles through VTV communication. The vehicle determines the corresponding locations of each navigation feature identified by each signal 403 and sorts the data 405 for inclusion in a displayed map.

Once the data is sorted (if sorting is desired), the vehicle may display the data on an in-vehicle or on-device map of the upcoming road. The sorting may sort the data to left-right-center, for example, identifying features on the left (typically roads and signs), on the right (again typically roads and signs) and in the middle of the road (typically traffic lights). Although not displayed in the environment in FIG. 2, businesses may also provide transmitters which can include the same data, allowing a vehicle to know the explicit GPS location of a particular business. Eventually, even housing number signs could include this data if a homeowner desired.

The vehicle could use this data to display the exact distance to and location of a particular business or house, or could supplement turn data with information such as "turn left in three hundred feet, just after the Ford Dealership on the left." The Ford Dealership could be shown on the map at its exact location identified by the signal, and would certainly make a much more visible real-world viewable turn marker than a street sign or traffic light. In fact, in many locales, this is a common method of providing directions, instead of saying "turn left at Rogers Road and then right onto Smith Street," a person may say "turn left in front of the high school and right at the clock tower." People accustomed to such landmark-based directions may find a map including self-identifying landmarks easier to navigate. This can also make navigation in foreign countries more user-friendly, since the landmark may be easier to identify than a sign in a foreign language and/or in an unexpected location.

The vehicle updates the map display 407 with all relevant location identified objects. Relevance in this example is defined by whether the object is ahead on a vehicle path and between the vehicle location and a turn location. In other examples, relevance could be determined by side of street, type of object and any other parameter deemed to increase or decrease a level of navigation instruction understandability. The vehicle displays the data as visual representations where appropriate, such as displaying a street sign, stop sign, traffic light, etc. on the map display. This can help a user gain faster visual understanding of the real world situation immediately ahead of the vehicle.

The vehicle also displays distances to each object or relevant objects 409. It may be the case that one or more objects self-identifies without providing GPS coordinates, or that the vehicle visually (through a camera) detects one or more objects that are not transmitting signals. The vehicle can still include these objects in the map display. In order to determine an unknown distance 411 to these objects, the vehicle can use a radar or camera system to determine a distance to an identified object. In other cases, an object may provide wireless communication but no GPS coordinates thereof, and so the vehicle can determine the distance based on RF signal transmission between the vehicle and the object. Once the vehicle knows the distance to any object, the vehicle can easily update the distance based on known vehicle speed and travel time.

The vehicle continues to display each identified object until the vehicle passes the object. Once the vehicle passes the object 415, the vehicle removes the object from the map 421, to improve driver understanding. In some cases, the vehicle may leave all or some objects on the map until the vehicle turns, which can be determined by driver preferences. In other cases, the vehicle may at least leave a turn-road or turn landmark on the map until the driver manages to maneuver the vehicle onto the proper road, in the case where the driver passes the turn without turning.

Once the vehicle has properly turned 417 (or, in some cases, turned at all, even if improperly), the vehicle clears the map of data 419. This can help avoid confusion and clutter with respect to a new upcoming turn, or in the event that a vehicle needs to re-route based on an improper turn. As previously noted, the vehicle may also leave at least the proper turn data displayed on the map until the driver reaches the correct road, even if the driver makes an improper turn. The vehicle may make the decision as to whether or not to leave the data dependent on whether new directions send the driver back to the original route (a turn-around) or along a new route. If the driver is returning to the original route, the previously displayed data will still be useful.

The illustrative embodiments provide for improved visual understanding of navigation directions in a manner that does not require drivers to guess at distances to upcoming turns based on a current lack of other information. While a vehicle need not display all the described information on a map, improving a map display by visually identifying some of the elements described herein and the like can help facilitate driver awareness and decision making. This allows the driver to react to upcoming turns in a more accurate manner.

While representative embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor, of a vehicle, configured to:
receive a plurality of data sets, from infrastructure-based transmitters, each set including data about fixed elements that is relevant to navigation guidance, including at least fixed locations of the transmitters;
determine the relevance of a given data set to navigation guidance along a current route based on predefined parameters;
disregard data determined to be irrelevant to navigation guidance along the current route; and
utilize non-disregarded data to enhance a navigation display by displaying navigation-guidance-related information indicated by the non-disregarded data on a navigation display including at least enhanced turn instructions displaying a plurality of transmitter locations including transmitter locations, identifiers and distances thereto, before, at and after a turn included in the current route.

2. The system of claim 1, wherein the data includes a business name and a location of the business having the business name.

3. The system of claim 2, wherein the predefined parameters include
distance before a navigation instruction execution point, of the current route, wherein data related to businesses not within a distance from the navigation instruction execution point, determined based on the locations of the businesses, is disregarded as irrelevant.

4. The system of claim 1, wherein the data includes an indicator of a traffic control feature and a location of the traffic control feature.

5. The system of claim 4, wherein the traffic control data is displayed regardless of the predefined parameters.

6. The system of claim 1, wherein the data includes a street name and a location of an intersection of a street having the street name with a current street.

7. The system of claim 6, wherein the predefined parameters include distance before a navigation instruction execution point, of the current route, is to be executed, wherein data related to street names of streets not within a distance from the navigation instruction execution point, determined based on locations of the intersections of the streets with the current street, is disregarded as irrelevant.

8. The system of claim 7, wherein the predefined parameters include side-of-street and wherein data related to street names on a side of the current street that is a different side from a direction in which a turn will occur at the navigation instruction execution point is disregarded as irrelevant.

9. The system of claim 1, wherein the predefined parameters include a type of object indicated by the data and a fixed location of the object and wherein the relevance determination includes contemplation of different relevance rules for different types of objects.

10. A method comprising:
receiving a plurality of data sets, at a vehicle, from infrastructure-based transmitters, each set including data about fixed elements that is relevant to navigation guidance, including at least fixed locations of the transmitters;
determining the relevance of a given data set to navigation guidance along a current route based on predefined parameters;
disregarding data determined to be irrelevant to navigation guidance along the current route; and
utilizing non-disregarded data to enhance a navigation display by displaying navigation-related information indicated by the non-disregarded data on a navigation display.

11. The method of claim 10, wherein the data includes a business name and a location of a business having the business name.

12. The method of claim 11, wherein the predefined parameters include distance before a navigation instruction execution point, of the current route, wherein data related to businesses not within a distance from the navigation instruction execution point, determined based on the locations of the businesses, is disregarded as irrelevant.

13. The method of claim 10, wherein the data includes an indicator of a traffic control feature and a location of the traffic control feature.

14. The method of claim 13, wherein the traffic control data is displayed regardless of the predefined parameters.

15. The method of claim 10, wherein the data includes a street name and a location of an intersection of a street having the street name with a current street.

16. The method of claim 15, wherein the predefined parameters include distance before a navigation instruction execution point, of the current route, is to be executed, wherein data related to street names of streets not within a distance from the navigation instruction execution point, determined based on locations of the intersections of the streets with the current street, is disregarded as irrelevant.

17. The method of claim 16, wherein the predefined parameters include side-of-street and wherein data related to street names on a side of a current street that is a different side from a direction in which a turn will occur at the navigation instruction execution point is disregarded as irrelevant.

18. The method of claim 10, wherein the predefined parameters include a type of object indicated by the data and a fixed location of the object and wherein the relevance determination includes contemplation of different relevance rules for different types of objects.

19. A non-transitory storage medium storing instructions that, when executed by a vehicle processor, cause the processor to perform a method comprising:
receiving a plurality of data sets from infrastructure-based transmitters, each set including data about fixed elements that is relevant to navigation guidance, including at least fixed locations of the transmitters;
determining the relevance of a given data set to navigation guidance along a current route based on predefined parameters;
disregarding data determined to be irrelevant to navigation guidance along the current route; and
utilizing non-disregarded data to enhance a navigation display by displaying navigation-related information indicated by the non-disregarded data on a navigation display.

20. The storage medium of claim 19, wherein the data includes at least one of a business name, a street name, or a traffic control feature indicator, and a corresponding location, and wherein the relevance is determined based at least in part on parameters defining different situational relevance considerations for each of, and based on whether the data relates to, a business, a street, or a traffic control feature.

* * * * *